United States Patent
Wittorff

(10) Patent No.: US 7,532,584 B2
(45) Date of Patent: May 12, 2009

(54) IMPLEMENTATION OF CONSTRAINTS TO ENSURE DEADLOCK AVOIDANCE IN NETWORKS

(75) Inventor: Vaughan William Wittorff, Bunbury (AU)

(73) Assignee: Complex Systems Research Limited, Cambridge (GB)

( * ) Notice: Subject to any disclaimer, the term of this patent is extended or adjusted under 35 U.S.C. 154(b) by 529 days.

(21) Appl. No.: 10/684,745

(22) Filed: Oct. 14, 2003

(65) Prior Publication Data

US 2004/0076122 A1    Apr. 22, 2004

(30) Foreign Application Priority Data

Oct. 14, 2002    (AU)    ............................... 2002952023

(51) Int. Cl.
*H04L 12/28*    (2006.01)
(52) U.S. Cl. ..................... 370/254; 370/401
(58) Field of Classification Search ................ 370/230, 370/254–256, 351, 356, 400, 401, 406
See application file for complete search history.

(56) References Cited

U.S. PATENT DOCUMENTS

| | | | | |
|---|---|---|---|---|
| 4,933,933 A | * | 6/1990 | Dally et al. ................. | 370/406 |
| 5,583,990 A | * | 12/1996 | Birrittella et al. ............. | 712/29 |
| 5,812,549 A | | 9/1998 | Sethu | |
| 5,831,975 A | * | 11/1998 | Chen et al. ................... | 370/256 |
| 5,831,982 A | * | 11/1998 | Hummel ...................... | 370/396 |
| 5,914,953 A | | 6/1999 | Krause et al. | |
| 5,999,517 A | * | 12/1999 | Koning et al. ................ | 370/255 |
| 6,031,835 A | * | 2/2000 | Abali et al. .................. | 370/388 |
| 6,065,063 A | * | 5/2000 | Abali .......................... | 709/242 |
| 6,333,918 B1 | * | 12/2001 | Hummel ...................... | 370/238 |
| 6,456,600 B1 | * | 9/2002 | Rochberger et al. ......... | 370/255 |
| 6,567,856 B1 | * | 5/2003 | Steele et al. ................. | 709/238 |
| 6,791,939 B1 | * | 9/2004 | Steele et al. ................. | 370/217 |
| 2001/0026533 A1 | * | 10/2001 | Schwager .................... | 370/229 |
| 2003/0185153 A1 | * | 10/2003 | Kohler et al. ................ | 370/230 |

FOREIGN PATENT DOCUMENTS

EP    0 294 890    12/1988

* cited by examiner

*Primary Examiner*—Hong Sol Cho

(57) ABSTRACT

A method of determining where to place routing constraints known as cuts in a network to result in a no-loop network, and a method of implementing such constraints in a hierarchical network; to avoid deadlocks. The method of determining where to place cuts in a network to result in a no-loop network comprises an algorithm for numbering the nodes within the network which is used to determine where the cuts are to be placed. The method of implementing constraints in a hierarchical network to result in a no-loop network comprises an algorithm for independently determining cuts and meta-cuts for each peer group, and imposing the necessary routing constraints in the network.

6 Claims, 8 Drawing Sheets

IMPLEMENTATION OF CONSTRAINTS TO ENSURE DEADLOCK AVOIDANCE IN NETWORKS

BACKGROUND OF THE INVENTION

The present invention relates to prevention of deadlocks in networks.

In a digital communication network, there is generally the need for the transmission of both real-time traffic and data traffic. In the case of real-time traffic, occasional packet loss is acceptable but end-to-end delay and delay variation must be small. It is therefore necessary to provide resourcing of bandwidth for such traffic. For data traffic however, end to end delay and delay variation are not critical but packet loss is not acceptable as the loss of a single network layer packet may require retransmission of all such packets forming part of higher layer protocols. While resourcing is therefore not necessary, it is necessary to provide control such that finite buffers cannot overflow. In such a case where controlled buffer space is shared between several connections, the possibility of deadlock arises. For example, in a network in which several nodes are linked in a ring, the situation may arise in which each node is full of packets destined for the next node in a cyclic orientation. The same deadlock possibility exists where controlled data is transmitted by datagrams rather than virtual connections (VCs). The present invention relates to either situation.

Two strategies have been suggested for prevention of such deadlocks. The first is not to share all of the buffer capacity, for example in the case of VCs, to reserve for each VC some amount of buffer capacity for the lifetime of the VC. However, this strategy has the drawbacks of requiring buffer management and traffic control on a per virtual connection basis and it leads to intolerably large latencies for all virtual connections during congestion. The second strategy involves imposing routing constraints in the form of cuts in the network to avoid such circular deadlocks (referring to Wimmer, W, (1978). Ein Verfahren zur Verhinderung von Verklemmungen in Vermittlemetzen, DESY DV-78/05. October 1978). A cut between two links is defined as a restriction imposed at a particular switch between two links which prevents controlled cells that enter the switch on one link from being switched to the other (and vice versa). The cuts are arranged to form what is known as a 'no loop network' ('nolon') in which no circular flows are possible but all nodes can still be reached.

While having cuts placed in a network prevents deadlocks, there are costs involved with the resulting reduced connectivity. These costs can be calculated and tend to increase with the number of cuts imposed in the network. It is therefore often beneficial to ensure that the minimum number of cuts is made in order to arrive at a nolon. However when information is available about information flows within the network, other factors might mean that a non-minimum number of cuts gives better performance. For example in the case where the main information flows are to be destined for or to come from one particular node, it is beneficial to ensure that all nodes have a shortest path to this designated node, even if this requires a non-minimum number of cuts.

It has been shown that deadlocks cannot occur in a nolon and that in certain circumstances the minimum number of cuts to realise a nolon can be calculated based on the number of nodes and arcs (links) in the network. The minimum number of cuts (m) satisfies the following expression:

$$m \geq e - n + 1$$

where 'e' is the number of arcs (links) and 'n' is the number of nodes. It has been shown that the equality holds only when each node can be numbered while satisfying a certain well-defined condition. The problem of finding a minimally constrained nolon (or any other nolon) has been found to be equivalent to numbering the nodes in a particular order and following a procedure for deriving the location of the cuts therefrom.

However, finding a correct numbering for the nodes has involved the use of a search algorithm to test different node numberings to find the minimum. One aspect of the present invention is directed at the problem of more efficiently finding a node numbering scheme which results in a minimally or near-minimally constrained nolon.

Another issue in relation to deadlock avoidance, is the implementation of the cuts in networks. Frameworks such as PNNI (Private Network Node Interface) provide topologies based on an abstract hierarchical structure used in communication networks for scalable routing. The nodes of such networks may be arranged into peer groups, where a peer group is defined as a group of nodes each having topological information about all others in the peer group, and with one designated the peer group leader. The nodes in a peer group can be physical layer nodes, or abstract nodes in a higher layer in the hierarchy. In the case where they are abstract nodes, each node corresponds to an entire peer group in a lower layer in the hierarchy, with that lower layer peer group represented in this higher layer by its own peer group leader.

A peer group leader is defined as the only node in a peer group with topological information about nodes outside of the peer group and its subsidiaries. It is the node to which other nodes within the peer group pass requests for routing to nodes outside the peer group and its subsidiaries, and to which nodes outside the peer group pass routing requests.

As mentioned previously, a cut between two links has been defined as a restriction imposed at a particular switch between two links which prevents controlled cells that enter the switch on one link from being switched to the other (and vice versa). With regard to hierarchical networks, we will define further the term meta-cut.

A meta-cut is defined to be analogous to a cut, but imposed between two arcs at an abstract node in a peer group that is not at the physical layer of the network.

Deadlock avoidance can be achieved as described above in such networks, by considering the entire physical network without regard for the hierarchical structure, and placing cuts throughout. However this is generally not practical, especially when it would be required to recalculate the cuts when any portion of the network changes or is reconfigured. Nor is it politically satisfactory when there is a desire for sub-networks to be self-configuring and autonomous. A second aspect of the present invention deals with a method of implementation of routing constraints in a hierarchical network.

BRIEF SUMMARY OF THE INVENTION

In accordance with one aspect of the present invention there is provided a method of determining where to place cuts in a network to result in a no-loop network, wherein the network comprises a plurality of nodes and a plurality of arcs interconnecting said nodes, the method comprising the steps of:

a) selecting a starting node, numbering said starting node as node 1 and designating each of the arcs coming from node 1 as being directed outwardly from node 1;

b) selecting one of the nodes remaining unnumbered and numbering as node n+1, where n is the number of nodes that have already been numbered, according to the following criterion:

(1) being connected to the already numbered nodes by the highest number of arcs;

and if criterion (1) provides for several possible candidate nodes, then selecting from these candidate nodes according to the following criterion:

(2) having the highest number of arcs connected thereto;

and if this still provides for several possible candidate nodes, then selecting from these candidate nodes arbitrarily;

and designating each of the undirected arcs coming from node n+1 as being directed outwardly from node n+1;

c) repeating step b until all of the nodes are numbered; and d) placing cuts in the nodes between pairs of incoming arcs.

The concept of directed arcs used in the above method does not mean that the links represented by the arcs cannot transmit in both directions, rather the directed arcs effectively impose a hierarchical switching structure on the network. In this hierarchy, flows can only go up-up (against the arrows on successive hops), down-down (with the arrows on successive hops), or up-down (against an arrow on one hop and then with an arrow on the next). This ensures circular flows are impossible.

In accordance with a second aspect of the present invention, there is provided a method of implementing constraints in a hierarchical network wherein the hierarchical network comprises a plurality of nodes and a plurality of interconnecting arcs in the physical layer arranged into one or more peer groups, each peer group being considered as a logical group node in a higher level peer group in the hierarchy, with an arbitrary number of such hierarchical levels, the method comprising the steps, performed independently for each peer group, of:

a) placing cuts or meta-cuts in the nodes of a peer group such that said peer group is a no-loop network;

b) if meta-cuts were determined in step a), implementing the meta-cuts as routing constraints in the network, so that for any node in which a meta-cut has been placed between two arcs, controlled traffic entering by way of one of said two arcs is prevented from leaving the lower level peer group represented by the node by way of the second of said two arcs, and vice versa.

BRIEF DESCRIPTION OF THE DRAWINGS

The present invention will now be described, by way of example, with reference to the accompanying drawings, in which.

In all figures, a cut is shown as a line segment intersecting the node, between and adjacent to the two arcs on which it is imposed.

Figure 3A:
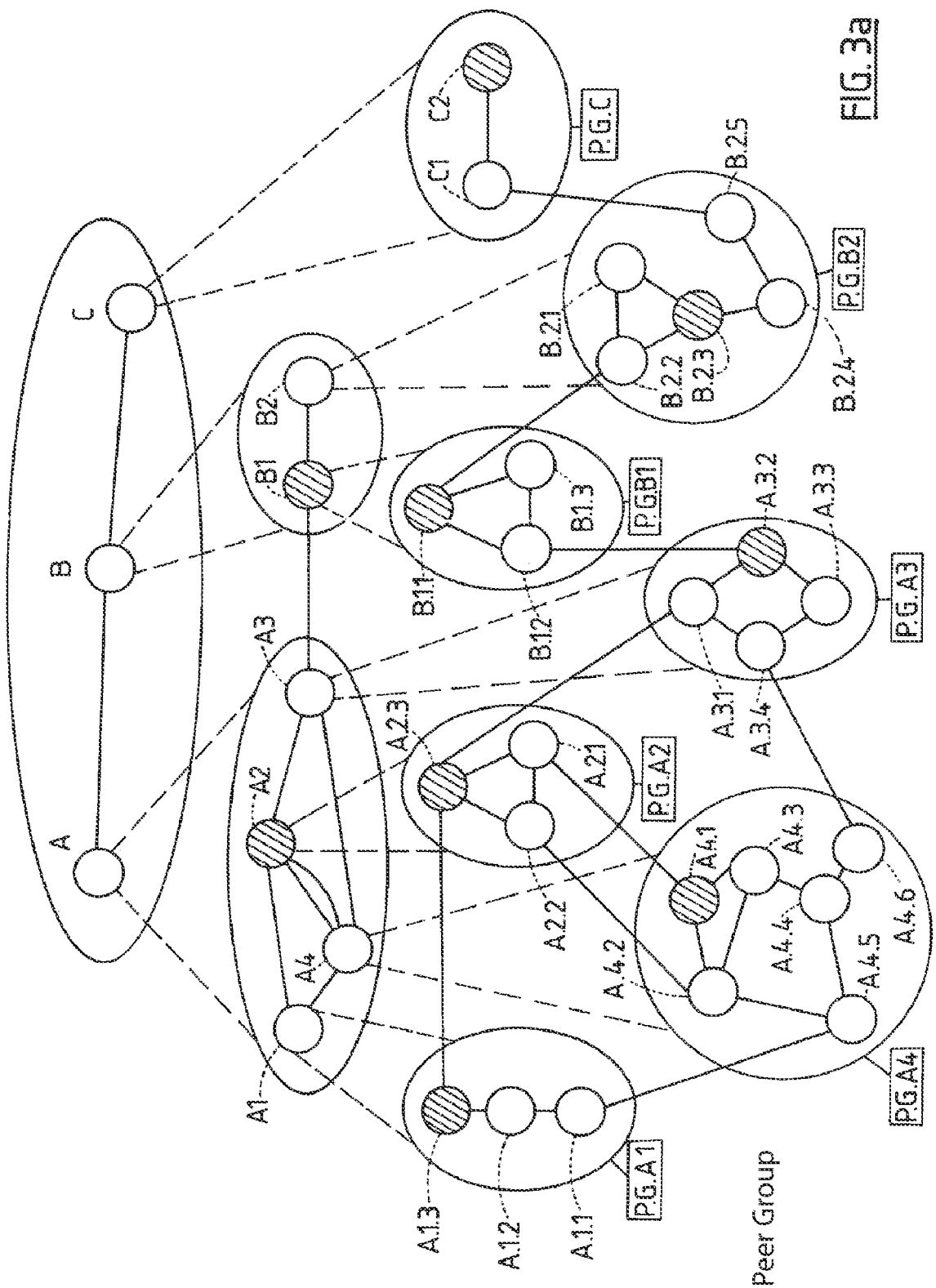
FIG. 3a is a view of a hierarchical network for implementation of the method of the second aspect of the present invention.

In FIG. 3a, for clarity, only the peer groups containing nodes at the physical layer are labeled, using the designation P.G. Collapsing of peer groups to corresponding abstract nodes in higher-layer peer groups is shown with dashed lines.

In FIGS. 3(a-h), peer group leaders are shown with cross hatching.

Figure 3B:
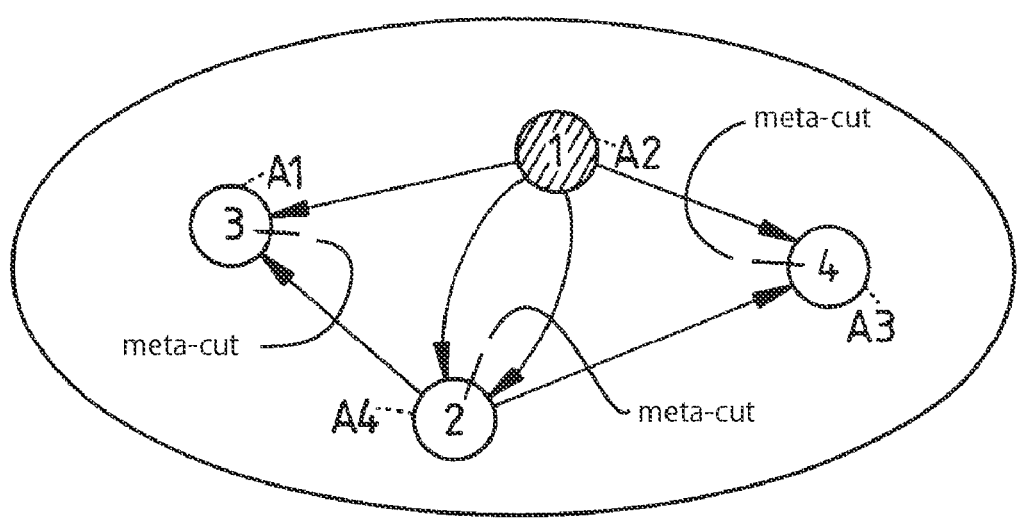
FIG. 3b is a view of a portion of the network of FIG. 3a showing implementation of a nolon in peer group A.
Figure 3C:
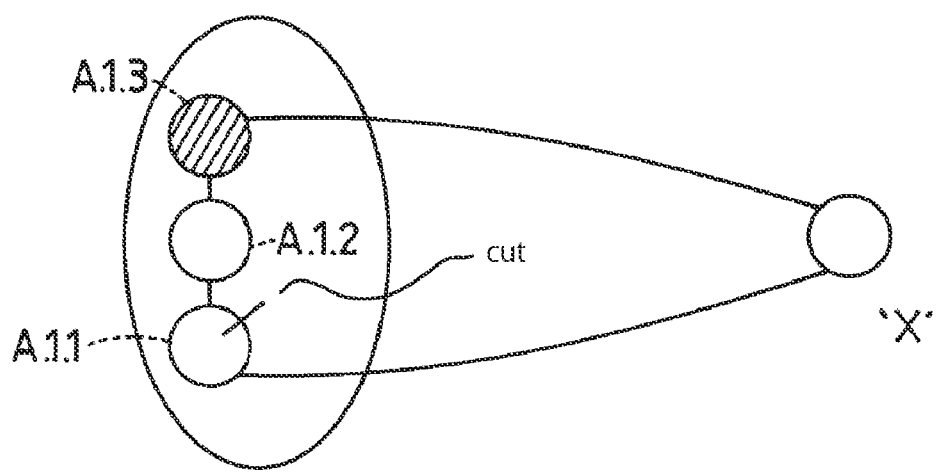
FIG. 3c is a view of a portion of the network of FIG. 3a showing implementation of a meta-cut determined in FIG. 3b by a method in accordance with the second aspect of the present invention in peer group A1.
Figure 3D:
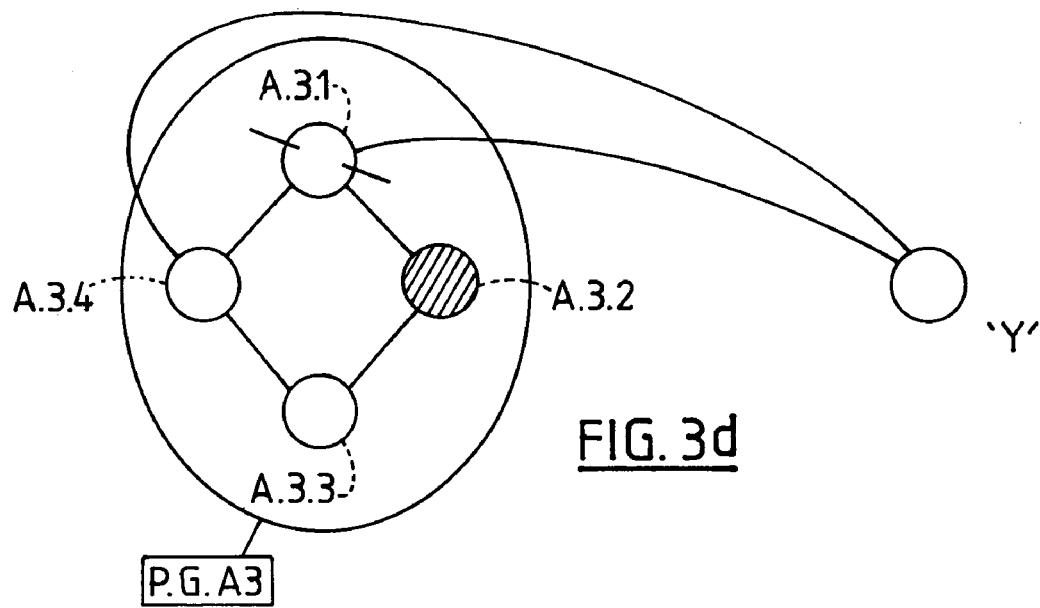
FIG. 3d is a view of a portion of the network of FIG. 3a showing implementation of a meta-cut determined in FIG. 3b by a method in accordance with the second aspect of the present invention in peer group A3.
Figure 3E:
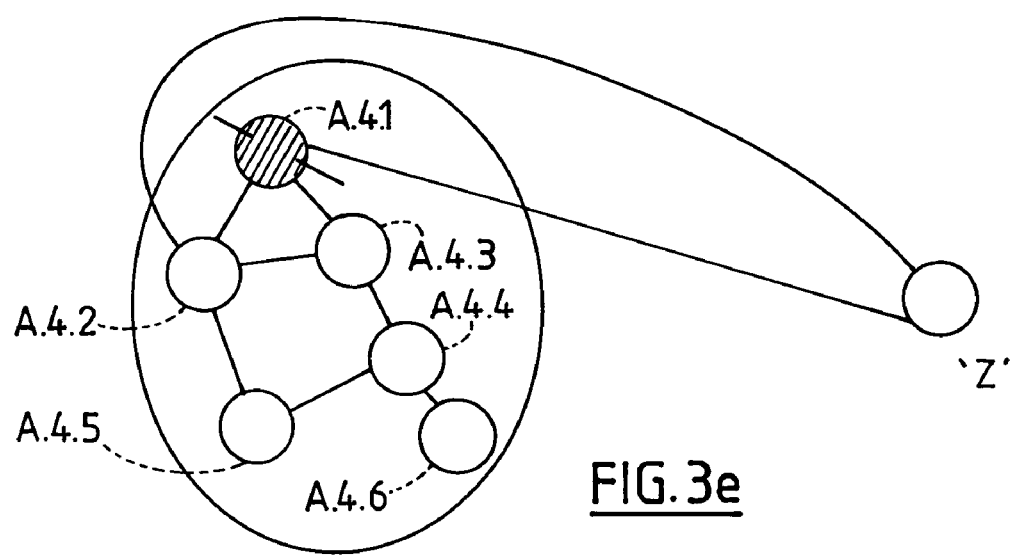
FIG. 3e is a view of a portion of the network of FIG. 3a showing implementation of a meta-cut determined in FIG. 3b by a method in accordance with the second aspect of the present invention in peer group A4.
Figure 3F:
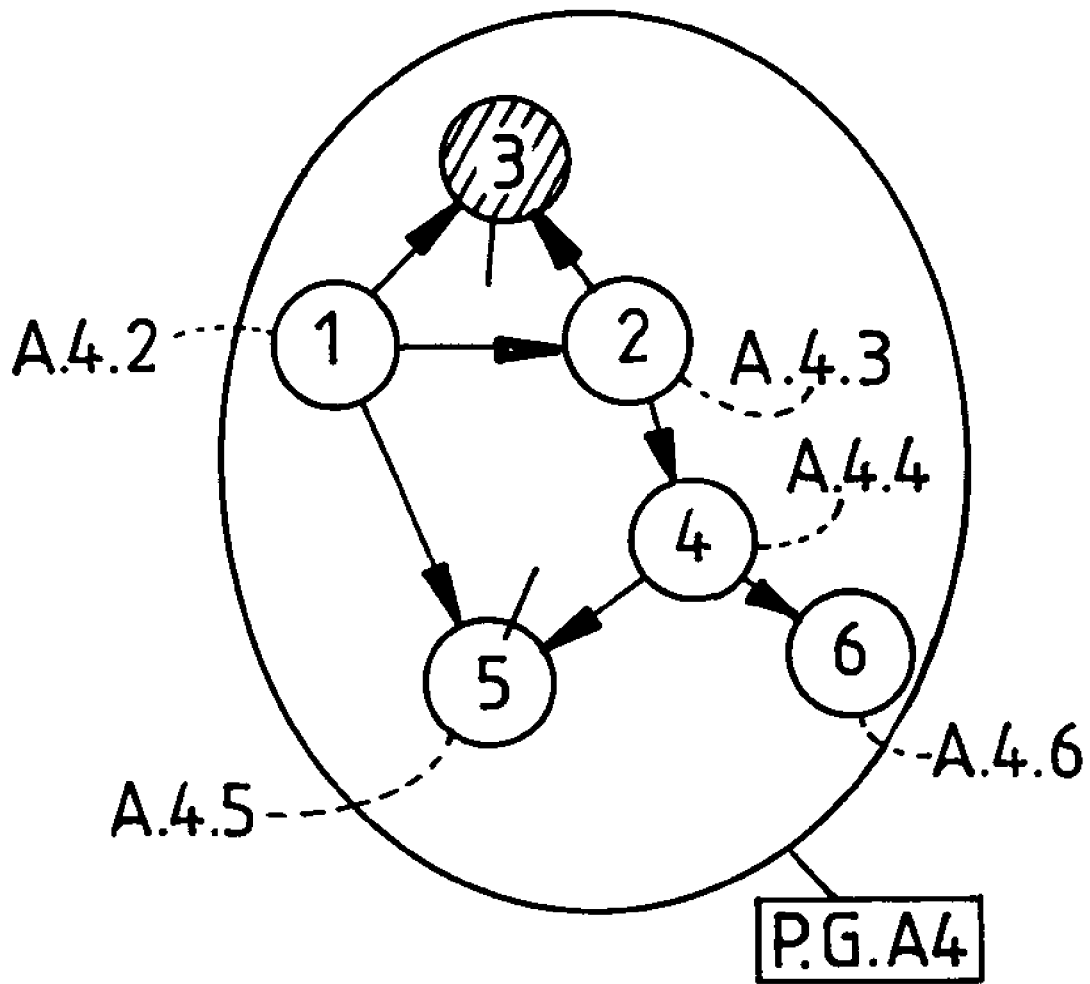
FIG. 3f is a view of the portion of the network of FIG. 3e showing implementation of internal cuts to form a nolon of peer group A4.
Figure 3G:
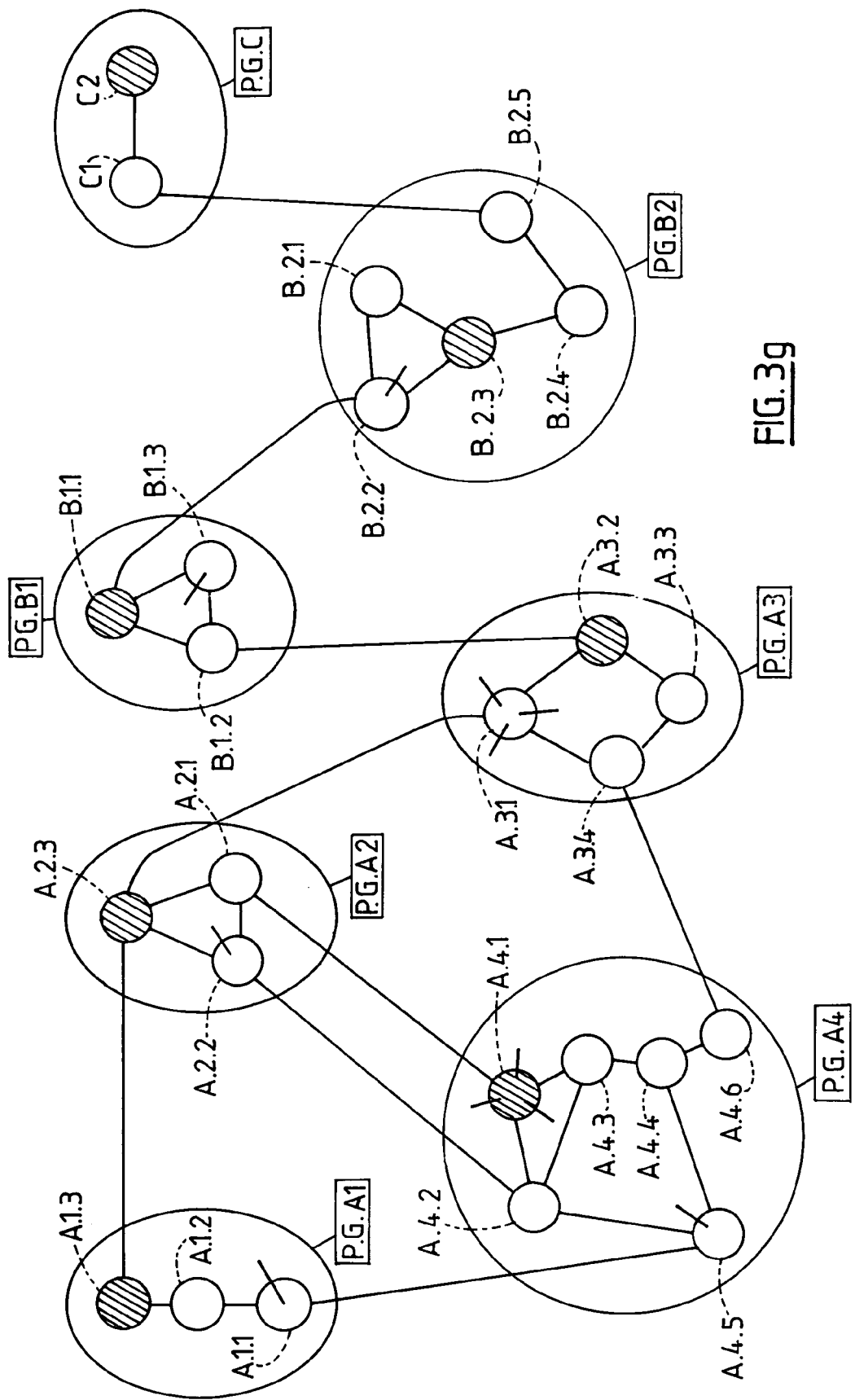
FIG. 3g is a view of the physical layer of the network of FIG. 3a showing the final implementation of cuts in accordance with a first embodiment of the second aspect of the present invention.
Figure 3H:
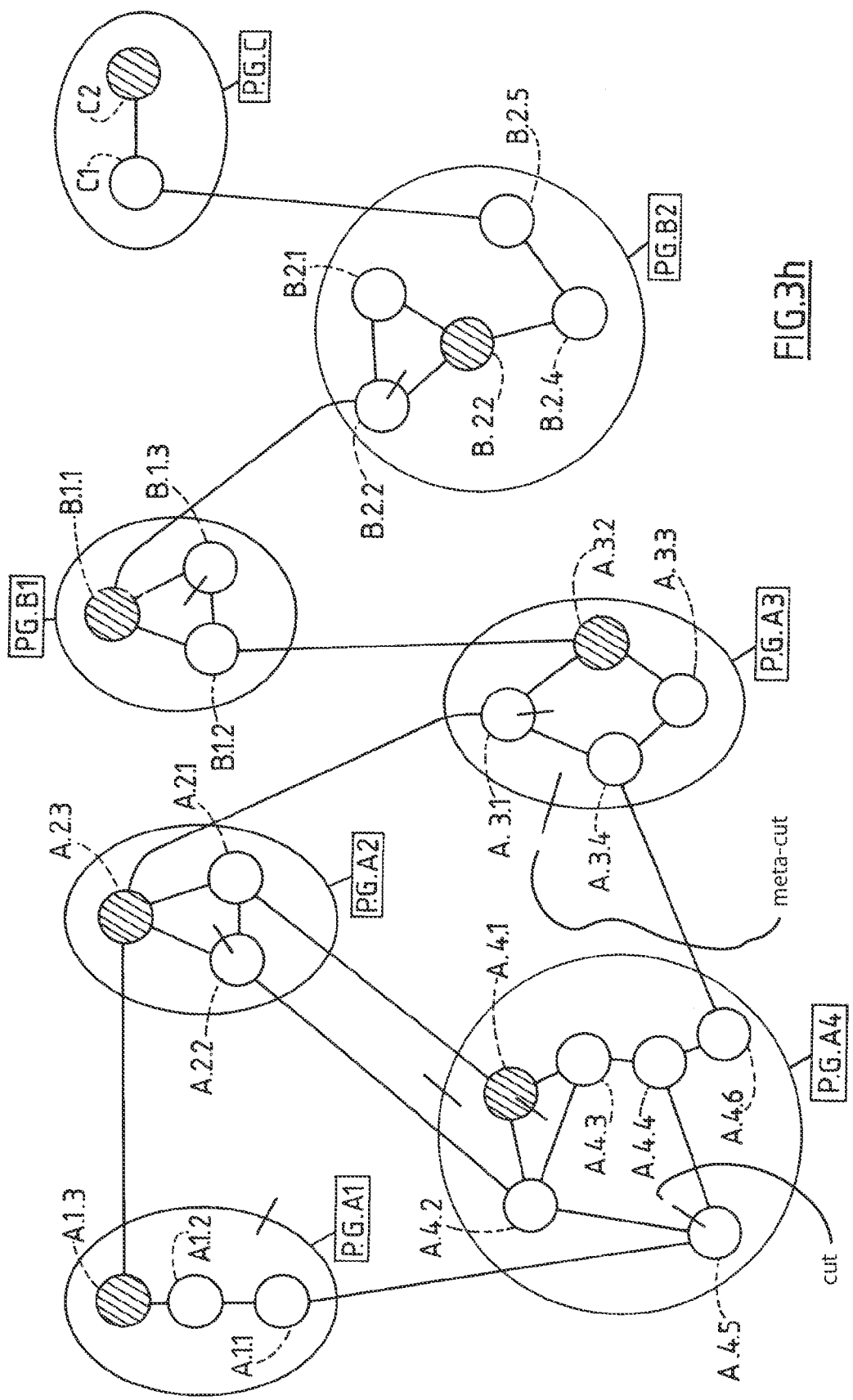
FIG. 3h is a view of the physical layer of the network of FIG. 3a showing the final implementation of cuts within the physical layer peer groups, but with the meta-cuts represented explicitly and not cascaded in the fashion of FIGS. 3(c-e), in accordance with a second embodiment of the second aspect of the invention.

In FIG. 3h, a meta-cut is shown as a line segment intersecting the ellipse enclosing the peer group, between and adjacent to the two arcs on which it is imposed.

DESCRIPTION OF THE INVENTION

Figure 1:
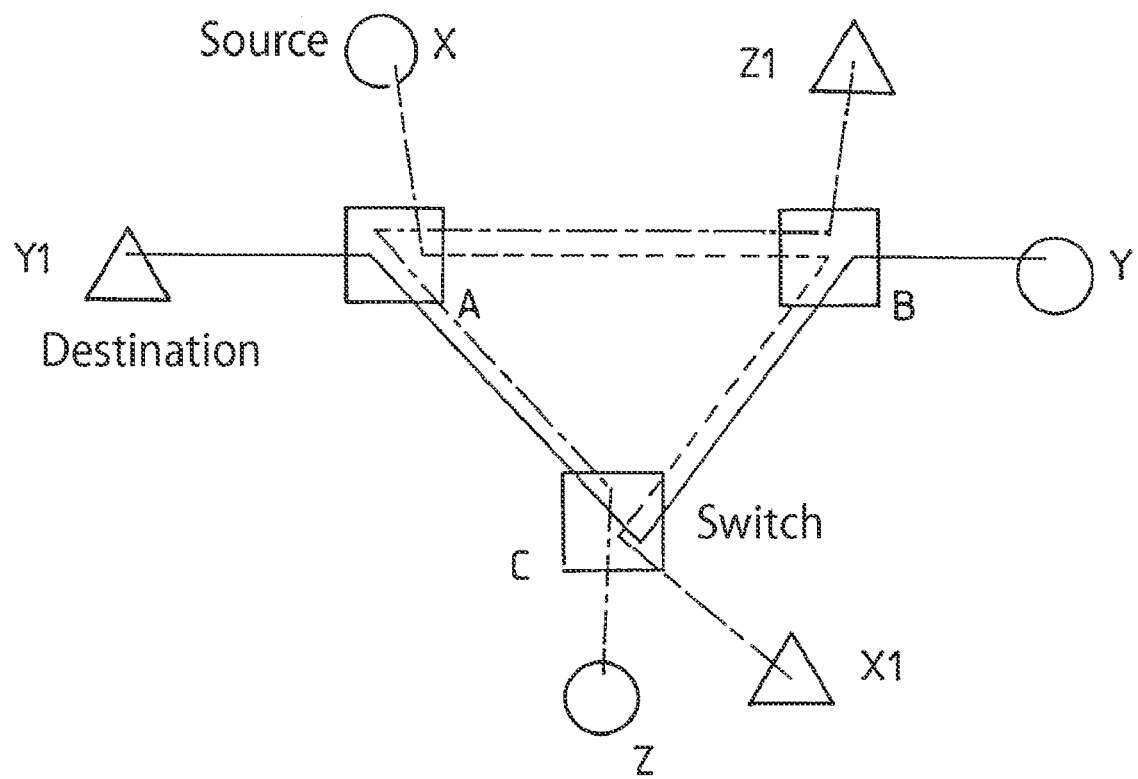
FIG. 1 is a view of a network having 3 nodes and showing 3 information flows for which indirect store and forward deadlock can occur.

Referring to FIG. 1, there is shown a communications network showing traffic routed from sources X,Y,Z to destinations X1,Y1,Z1 respectively in a way which may result in one type of deadlock (namely indirect store and forward deadlock) to which the present invention is directed. In this case, there are 3 nodes, A, B and C via which three data sources attempt to transmit data. In the network, each of the nodes is restricted from transmitting data to another node unless it has information that that node has buffer space available. If the data paths combine to form a ring as shown, with each pair of adjacent links carrying traffic having originated from at least one source in common, then indirect store and forward deadlock may result. That is, each node can become full of data packets awaiting onward transmission via the adjacent node in the ring, but no packets can be sent because all receiving buffers are full, resulting in deadlock.

In this example, placing a single cut in any node between any pair of links in the ring would prevent such a deadlock situation occurring. For example, placing a cut at node C, between the links to A and B (that is, preventing C from forwarding any data from A to B or vice versa) would prevent deadlock.

As discussed previously, it is known that determining cut locations to produce a nolon is equivalent to numbering the nodes, ensuring at every stage that the set of so-far numbered nodes is connected. On numbering each node, the arcs connected from that node are designated as being directed away from the node and cuts are placed at each node between pairs of incoming arcs. There are several ways of numbering the nodes in this way, each corresponding to a nolon, with various numbers of cuts in general. In the absence of an algorithm, in order to find a nolon with the minimum number of cuts it is generally necessary to test all numbering permutations.

The first aspect of the present invention relates to numbering the nodes in a network without requiring a search algorithm, in order to produce a nolon. The nolon produced by the method may be minimally constrained, depending on the choice of the starting node, or may satisfy other requirements. The steps of the method are as described below:

1) Choose a node as the starting node (n=1), according to some criterion, for example:
   being a node with the highest number of connected arcs, and if there is more than one candidate, then selecting from these candidates arbitrarily;
   Designate all of the arcs connected to this node as being directed away from this node.
2) Choose and number as n+1 the unnumbered node which is connected to the already numbered nodes by the highest number of arcs. If there is more than one such node, select from these the node which has the highest number of nodes connected thereto. If there is more than one candidate fulfilling this criterion, select from these candidates arbitrarily. Designate all of the undesignated arcs connected to the selected node as being directed away from this node.
3) Repeat step 2) until all of the nodes are numbered.
4) Place cuts in the nodes between pairs of incoming arcs.

If in the above method, the example criterion in step 1 is used, the method will usually produce a minimally constrained nolon, but in some configurations will produce only a near-minimally constrained nolon. An example of a network configuration where a non-minimally constrained nolon is produced is one where there exists a node that if removed from the network would result in two or more disconnected sub-networks. In such a situation, each sub-network (each considered to include the common node) can be considered independently and the above method applied to each to produce what would separately be minimally constrained nolons. Deadlock in the combined network is then not possible, provided that once an information flow has traversed the common node from one sub-network to the other, it cannot cross back again. This is similar to the concept of peer groups, which are treated in the second aspect of the invention.

Any other criterion can be used in step a of the above method to select the starting node, including selecting it arbitrarily, and each choice of starting node could result in a different nolon. Any criterion for the choice of the starting node is deemed to be within the scope of the present invention.

Figure 2A:
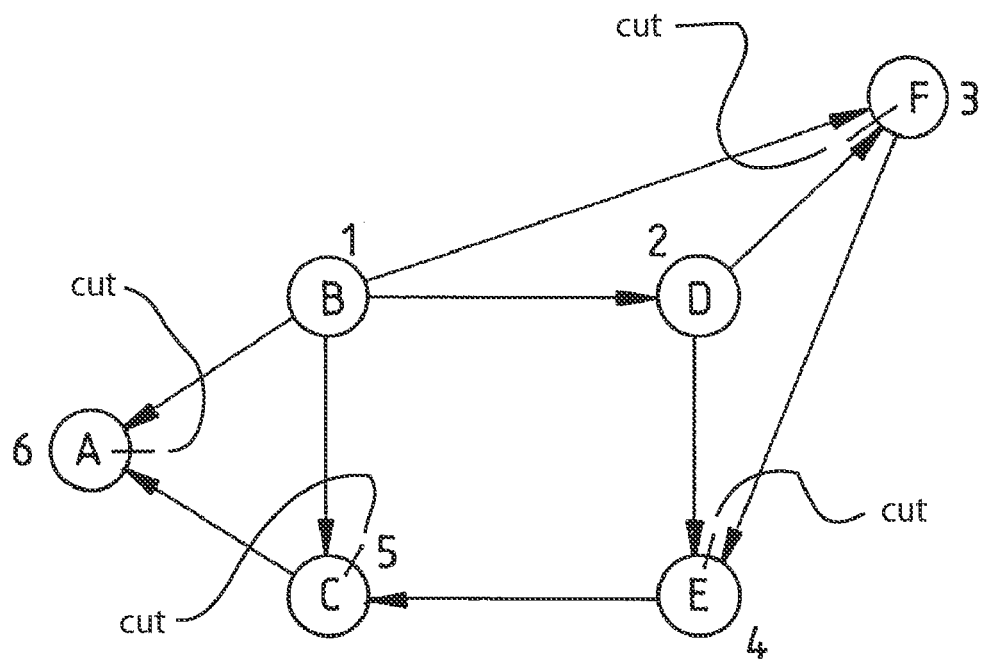
FIG. 2a is a view of a network having 6 nodes and 9 arcs having node numbering resulting in a nolon with the smallest possible number of cuts.
Figure 2B:
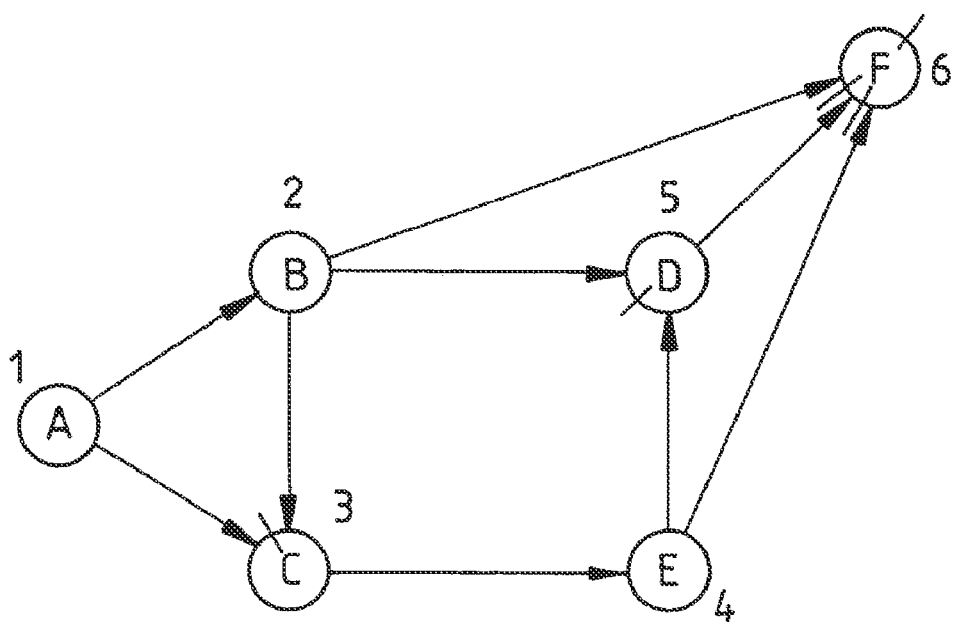
FIG. 2b is a view of the network of FIG. 2a numbered such that a nolon results having a greater number of cuts.

FIG. 2a shows an example of a resulting network numbering scheme using this method, resulting in a minimally constrained network. In FIG. 2a the nodes have been numbered in a way that each of the nodes, when numbered, is connected to already numbered nodes by no more than 2 arcs. This is the well-defined condition mentioned earlier (see Background of the Invention) and consequently this minimally constrained network has $m=e-n+1=9-6+1=4$ cuts. FIG. 2b shows the network of FIG. 2a having a numbering scheme in which the method has not been applied. In FIG. 2b it can be seen that when node F is numbered as 6 it is connected to the already numbered nodes by 3 arcs, and the resulting number of cuts is $5>m$, so the network is not minimally constrained.

The second aspect of the present invention relates to the implementation of cuts as described above in a hierarchical network. As mentioned previously, considering a network as a flat network for the purpose of implementing the cuts presents practical difficulties in large networks where changes in the network are common, and self-configuration and autonomy is desired by different sub-networks.

The second aspect of the present invention which provides a method for determining where to place the cuts in a hierarchical network by determining cuts in each peer group independently and imposing routing constraints in the network in order to implement the meta-cuts, allows for easier implementation of changes in the routing constraints in larger changing networks that are already configured in a hierarchical arrangement, such as PNNI networks.

The method comprises the following steps (performed independently for each peer group):

1) Whenever the topology of a peer group changes, number the nodes within the peer group to create a nolon.
2) If the peer group is at the physical level, the cuts are real and the process for this peer group is complete. If not, the cuts are meta-cuts and each must be implemented so as to prevent switching between the two lower layer peer groups via the lower layer peer group represented by the node in which the meta-cut has been imposed.

FIG. 3a shows a network which will be used to illustrate implementation of the above method. As the highest level of the hierarchy is already a nolon, we can start at Logical Group Node A (LGN A, which corresponds to peer group A). FIG. 3b shows an arrangement of cuts in peer group A implemented to form a nolon. As none of the nodes in peer group A is in the physical layer, the meta-cuts placed in these nodes must be implemented as routing constraints in the network in a way that achieves their aim.

According to a first embodiment of the above method, this meta-cut is implemented by means of a check performed by the peer group leader node A.1.3. In general the peer group leader node of any peer group is the node which determines whether to accept a connection request either into or through that peer group. Consider first the cut in A1 between links from A2 and A4. If node A.1.3. receives a connection request from node A.2.3, which needs to be passed through to P.G.A4, A.1.3. (as the peer group leader) will usually perform two checks. Firstly, it needs to be determined whether the peer group P.G.A1 can provide a path to a node terminating an external arc to P.G.A4 (that boundary node being A.1.1). This question is addressed within P.G.A1, at the lower level. Secondly, it needs to be determined whether the peer group leader of P.G.A4 (being A.4.1) will accept the connection request. This is a meta-level issue, between the two peer group leaders.

To implement the meta-cut, a third check is introduced, that is for A.1.3 to determine if granting such a request would violate the meta-cut. In this case it would cause a violation, and so the peer group leader of the origin of the request (A.2.3) would be informed that the request is rejected.

Thus the meta-cut is implemented exactly analogously to a standard cut, but stored in the peer group leader, for constraining through-connection requests between certain pairs of adjacent peer groups. Since such requests are made by and to the respective leaders, the cut can be simply stored in the peer group leader's routing table as a ban on connections requested between the leaders of the two adjacent peer groups.

The cuts shown in FIG. 3b in nodes A3 and A4 are implemented in a similar manner by checks performed by the peer group leaders of lower level peer groups PGA3 and PGA4. The method described above is continued by independently placing cuts in each of the peer groups PGA1-4.

An alternative embodiment of implementing the invention described in the above method is shown in FIGS. 3c to 3e and 3g. In the alternative embodiment, the meta-cuts to be implemented in lower level peer groups are cascaded down to the lower level peer groups as further cuts. A meta-cut between two arcs is cascaded down to said lower level peer group by either:

a) if the external arcs in the lower level peer group represented by the two arcs are connected to two different lower level nodes, selecting the lower level node which terminates the smaller number of internal arcs, or if the two different lower level nodes terminate the same number of internal arcs then select one of the nodes arbitrarily; and placing cuts in the selected lower level node between the external arc and each of the internal arcs connected to the selected lower level node; or b) if the external arcs in the lower level peer group represented by said two arcs are connected to the same lower level node;

placing a cut between the external arcs in said lower level node; and c) if necessary, repeating the method recursively until all meta-cuts so-produced have been cascaded to the physical layer.

FIG. 3c shows PGA1 including the external links to PGA2 and PGA4 which are represented in the higher layer by the links to A2 and A4, between which the cut has been placed. The external links are drawn with the external nodes abstracted as a single node. According to the alternate embodiment of the method, cuts are placed in the PGA1 in the border node (the border nodes being the nodes with the external arcs) with the smaller number of internal arcs to disconnect the external arc from the internal arcs. In this case each of the border nodes has one internal arc and therefore the choice is made arbitrarily to be a cut in A1.1. PGA1 is a nolon and so no internal cuts are required.

Consider the cascading of the cut in LGN A3 between links from A2 and A4 according to the alternative embodiment of the method. FIG. 3d shows peer group PGA3 with the external links to PGA2 and PGA4 abstracted into a single external node. Again, each of the border nodes has the same number of internal links (two) and we can therefore place the cuts in either node. We will place the cuts arbitrarily in node A3.1 to disconnect the external arc from the internal arcs.

FIG. 3e shows the same process applied to the cut in LGN A4 between the two links to A2. The external links to peer group PGA2 are abstracted to a single node and in this case, node A4.1 has two internal links while A4.2 has three. Therefore the cuts are placed in A4.1 to disconnect the external link from each of the internal links. It is noted that peer group PGA4 is not a nolon and it is therefore necessary to determine the internal cuts required to create a nolon, whichever embodiment of the method is used. One implementation of the internal cuts is shown in FIG. 3f.

FIG. 3g shows the physical layer of the network of FIG. 3a with the cuts implemented according the alternative embodiment of the method of the second aspect of the present invention as described above. Eleven cuts are required in total, compared with the minimum number of m=9 to create a nolon by considering the entire physical network without regard for the hierarchical structure.

FIG. 3h shows the physical layer of the network of FIG. 3a with cuts and meta-cuts implemented according to the first embodiment of the method of the second aspect of the present invention as described above. Meta-cuts are represented by cuts on the boundary of a peer group, between the two external arcs involved in the meta-cut. Six cuts and three meta-cuts are required, compared with the minimum number of m=9 to create a nolon by considering the entire physical network without regard for the hierarchical structure.

Both embodiments of the method of the second aspect of the invention have the property that the implementation of cuts within peer groups is separate to and independent of the implementation of cuts between peer groups. If there is an advantage of the alternative embodiment, where the meta-cuts are cascaded to the physical layer, it is that all meta-cuts are implemented in the physical layer between specific physical nodes. However this embodiment has the disadvantage that when step (a) of its method is applicable, the cascaded cuts will prevent any controlled traffic from flowing into or out of the peer group using one of the external arcs, forcing all of the traffic to flow into or out of the peer group using only one of two available routes.

Modifications and variations as would be apparent to a skilled addressee are deemed to be within the scope of the present invention.

The invention claimed is:

1. A method of determining where to place cuts in a network to result in a no-loop network, wherein the network comprises a plurality of nodes and a plurality of arcs interconnecting said nodes, the method comprising the steps of:

a) selecting a starting node, numbering said starting node as node 1 and designating each of the arcs coming from node 1 as being directed outwardly from node 1;

b) selecting one of the nodes remaining unnumbered and numbering as node n+1, where n is the number of nodes that have already been numbered, according to the following criterion:

(1) being connected to the already numbered nodes by the highest number of arcs;

and if criterion (1) provides for several possible candidate nodes, then selecting from these candidate nodes according to the following criterion:

(2) having the highest number of arcs connected thereto;

and if this still provides for several possible candidate nodes, then selecting from these candidate nodes arbitrarily;

and designating each of the undirected arcs coming from node n+1 as being directed outwardly from node n+1;

c) repeating step b until all of the nodes are numbered; and d) placing cuts in the nodes between pairs of incoming arcs.

2. The method of determining where to place cuts in a network to result in a no-loop network in accordance with claim 1, wherein the starting node is selected as being a node with the highest number of connected arcs, and if there is more than one candidate, the starting node is chosen arbitrarily from the candidates.

3. A method of implementing constraints in a hierarchical network wherein the hierarchical network comprises a plurality of nodes and a plurality of interconnecting arcs in the physical layer arranged into one or more peer groups, each peer group being considered as a logical group node in a higher level peer group in the hierarchy, with an arbitrary number of such hierarchical levels, the method comprising the steps, performed independently for each peer group, of:

a) placing cuts or meta-cuts in the nodes of a peer group such that said peer group is a no-loop network;

b) if meta-cuts were determined in step a), implementing the meta-cuts as routing constraints in the network, so that for any node in which a meta-cut has been placed between two arcs, controlled traffic entering by way of one of said two arcs is prevented from leaving the lower level peer group represented by the node, by way of the second of said two arcs, and vice versa.

4. The method of implementing constraints in a hierarchical network in accordance with claim 3, wherein the implementation of said routing constraints in the network comprises the steps of:

the peer group leader of the lower level peer group, corresponding to the Logical Group Node containing the said meta-cut, performing a check to determine if a connection request from a peer group connected to said lower level peer group by one of two said arcs is destined for a peer group connected to said peer group by the other of two said arcs; and rejecting the connection request if the result of the check is true.

5. The method of implementing constraints in a hierarchical network in accordance with claim 3, wherein the implementation of said routing constraints in the network comprises introducing cuts in said lower level peer group.

6. The method of implementing constraints in a hierarchical network in accordance with claim 5, wherein the cuts are introduced in said lower level peer group by:

A) if the external arcs in the lower level peer group represented by said two arcs are connected to two different lower level nodes, selecting the lower level node which terminates the smaller number of internal arcs, or if the two different lower level nodes terminate the same number of internal arcs then select one of the nodes arbitrarily; and placing cuts in said selected lower level node between the external arc and each of the internal arcs connected to said selected lower level node; or B) if the external arcs in the lower level peer group represented by said two arcs are connected to the same lower level node;

placing a cut between the external arcs in said lower level node.

* * * * *